(12) United States Patent
Vassallo et al.

(10) Patent No.: US 8,967,126 B2
(45) Date of Patent: Mar. 3, 2015

(54) EXHAUST GAS RECIRCULATION COOLER FOR AN INTERNAL COMBUSTION ENGINE

(75) Inventors: Alberto Vassallo, Turin (IT); Hans Drangel, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 13/586,980

(22) Filed: Aug. 16, 2012

(65) Prior Publication Data

US 2013/0042842 A1    Feb. 21, 2013

(30) Foreign Application Priority Data

Aug. 17, 2011   (GB) .................................. 1114156.1

(51) Int. Cl.
| | | |
|---|---|---|
| *F02M 25/07* | (2006.01) | |
| *F01P 3/20* | (2006.01) | |
| *F02B 29/04* | (2006.01) | |

(52) U.S. Cl.
CPC .............. *F01P 3/20* (2013.01); *F02M 25/0728* (2013.01); *F02M 25/0731* (2013.01); *F02M 25/0732* (2013.01); *F02M 25/0738* (2013.01); *F02B 29/0406* (2013.01); *Y02T 10/121* (2013.01); *F01P 2060/16* (2013.01)
USPC ................... 123/568.12; 123/41.31

(58) Field of Classification Search
USPC .......................................... 123/41.31, 568.12
See application file for complete search history.

(56) References Cited

U.S. PATENT DOCUMENTS

| | | | | |
|---|---|---|---|---|
| 7,380,544 | B2 * | 6/2008 | Raduenz et al. | 123/568.12 |
| 7,581,533 | B1 * | 9/2009 | Moran | 123/568.12 |
| 2005/0188965 | A1 * | 9/2005 | Usui | 123/568.12 |
| 2007/0267000 | A1 * | 11/2007 | Raduenz et al. | 123/568.12 |
| 2008/0149080 | A1 | 6/2008 | Reuss et al. | |

FOREIGN PATENT DOCUMENTS

| | | |
|---|---|---|
| EP | 1840365 A1 | 10/2007 |
| GB | 2472322 A | 2/2011 |
| GB | 2473821 A | 3/2011 |
| WO | 2005001275 A2 | 1/2005 |

* cited by examiner

*Primary Examiner* — Erick Solis
(74) *Attorney, Agent, or Firm* — Ingrassia Fisher & Lorenz, P.C.

(57) ABSTRACT

An exhaust gas recirculation cooler for an internal combustion engine is provided. The exhaust gas recirculation cooler includes an external casing with an inlet and an outlet for an exhaust gas flow. A first tube bundle and a second tube bundle, each with an inlet and an outlet for a coolant, are located inside the external casing so that the exhaust gas flow flows through the first tube bundle and the second tube bundle in series. A bypass passage conveys the exhaust gas flow from downstream the first tube bundle to the outlet of the external casing bypassing the second tube bundle. The bypass passage is located inside the external casing between the first tube bundle and the second tube bundle.

6 Claims, 2 Drawing Sheets

EXHAUST GAS RECIRCULATION COOLER FOR AN INTERNAL COMBUSTION ENGINE

CROSS-REFERENCE TO RELATED APPLICATION

This application claims priority to British Patent Application No. 1114156.1, filed Aug. 17, 2011, which is incorporated herein by reference in its entirety.

TECHNICAL FIELD

The technical field generally relates to an exhaust gas recirculation cooler for an internal combustion engine, in particular an internal combustion engine of a motor vehicle.

BACKGROUND

In order to reduce the polluting emission, most internal combustion engines, principally diesel engines, are equipped with an exhaust gas recirculation (EGR) system for selectively routing back a part of the exhaust gas from an exhaust manifold of the internal combustion engine into an intake manifold of the internal combustion engine. The recirculated exhaust gas is mixed with fresh induction air and is fed into engine cylinders, thereby reducing the production of oxides of nitrogen (NOx) during the combustion process.

Conventional EGR systems comprise an EGR conduit fluidly connecting the exhaust manifold to the intake manifold, an EGR cooler located in the EGR conduit for cooling the exhaust gas before mixing it with the induction air, and a valve for regulating the flow rate of the exhaust gas to be recirculated in the EGR conduit.

In order to improve temperature control of the recirculated exhaust gas, some EGR systems may comprise two EGR coolers located in series along the EGR conduit. The first EGR cooler is designed to cool the exhaust gas that comes at high temperature (up to about 700°) straight from the exhaust manifold, while the second EGR cooler receives the exhaust gas already partially cooled by the first EGR cooler and is designed to cool the exhaust gas to even lower temperature values (down to about 50° C.). In this way, the exhaust gas is subjected to two cooling stages, including a so called high-temperature cooling stage in the first EGR coolant and a so called low-temperature cooling stage in the second EGR cooler. The first EGR cooler is usually connected with the cooling circuit of the internal combustion engine, so that the high-temperature cooling stage is performed with the aid of the same coolant used for cooling down other engine components, such as engine block and cylinder head. The second EGR cooler is connected to a dedicated coolant circuit so that the high-temperature cooling stage is performed with the aid of a different coolant. A bypass conduit and an associated bypass valve may be provided for the exhaust gas to bypass the second EGR cooler, for example when the value of the exhaust gas temperature is below a predetermined threshold value thereof.

The first and the second EGR cooler may be embodied as a single component, usually referred to as a duel-temperature EGR cooler, which comprises an external casing provided with an inlet and an outlet for the exhaust gas flow and two tube bundles, which are individually provided with an inlet and an outlet for a coolant and which are located inside the external casing so that the exhaust gas flow flows through the tube bundles in series. In this way, the first tube bundle performs the high-temperature cooling stage, whereas the second tube bundle performs the low-temperature cooling stage. The bypass conduit is embodied as a passage defined inside the external casing, alongside the two tube bundles.

Because both tube bundles are located in the same casing but are designed to perform at different temperature values, unwanted exchange of heat between them could reduce the EGR cooler efficiency. Normally the two tube bundles are separated by a separating wall but often this is not enough to prevent unwanted exchange of heat.

Furthermore, during operation, deposits or soot can form on the interior surfaces of the tube bundles causing the EGR cooler to be less efficient and leading to fouling and potential plugging. This phenomenon is more pronounced at lower temperature values making the second tube bundle more sensitive to fouling deterioration.

At least one object herein is to provide an EGR cooler that increases the thermal insulation between the first and the second tube bundles while at the same time helping in the prevention of fouling in the tube bundles and optimizing the layout of the EGR cooler.

Another object herein is to meet these goals by means of a simple, rational and low cost solution. In addition, other objects, desirable features and characteristics will become apparent from the subsequent summary and detailed description, and the appended claims, taken in conjunction with the accompanying drawings and this background.

SUMMARY

According to an exemplary embodiment, an Exhaust Gas Recirculation (EGR) cooler for an internal combustion engine is provided. The EGR cooler comprises an external casing provided with an inlet and an outlet for an exhaust gas flow and a first and a second tube bundle. The first and the second tube bundle are individually provided with an inlet and an outlet for a coolant and are located inside the external casing so that the exhaust gas flow flows through the tube bundles in series. A bypass passage of the EGR cooler conveys the exhaust gas flow from downstream the first tube bundle to the outlet of the external casing bypassing the second tube bundle, wherein the bypass passage is located inside the external casing between the first tube bundle and the second tube bundle.

In this regard, the thermal insulation between the first tube bundle and the second tube bundle is increased. Furthermore the layout of the EGR cooler is optimized since the same component, the bypass passage, is used for two distinct purposes, thermal insulation and bypassing, and no additional components are required. Also due to the bypass passage, unnecessary passage of the exhaust gas in the second tube bundle is avoided reducing potential fouling in the EGR cooler.

According to another embodiment, the EGR cooler comprises a valve for selectively allowing the exhaust gas to flow into the bypass passage.

In this regard, it is possible to control the path of the exhaust gas and to selectively bypass the second tube bundle. Advantageously the fouling durability of the second tube bundle is increased.

According to a further embodiment, an internal combustion engine system comprises an internal combustion engine, an intake manifold, an exhaust manifold and an EGR cooler wherein the exhaust gas inlet of the external casing is fluidly connected to the exhaust manifold and the exhaust gas outlet of the external casing is fluidly connected to the intake manifold.

The polluting emission of an internal combustion engine is improved by using an EGR cooler, according to an embodiment, that presents increased fouling durability and increased efficiency.

According to another embodiment, the internal combustion engine system comprises an EGR cooler bypass conduit for bypassing the EGR cooler and an EGR valve for selectively allowing the exhaust gas flow to flow into the EGR bypass conduit.

In this regard, the EGR cooler fouling durability is improved by avoiding a flow of the exhaust gas in the EGR cooler unless strictly necessary.

According to a further embodiment, the first tube bundle of the internal combustion engine system is fluidly connected to a first coolant circuit and the second tube bundle is fluidly connected to a second independent coolant circuit.

In this regard, the EGR cooler efficiency is improved by using two separate cooling circuits, one for each tube bundle, wherein the relative coolants may be kept at different temperature value.

According to yet another embodiment, the first coolant circuit comprises an engine coolant circuit.

The internal combustion engine layout is improved by using the engine coolant circuit as coolant circuit for the first tube bundle of the EGR cooler and, thus, it is not necessary to add an additional coolant circuit.

In this way the first and second tube bundles independently are provided and the efficiency of the cooling process is improved.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
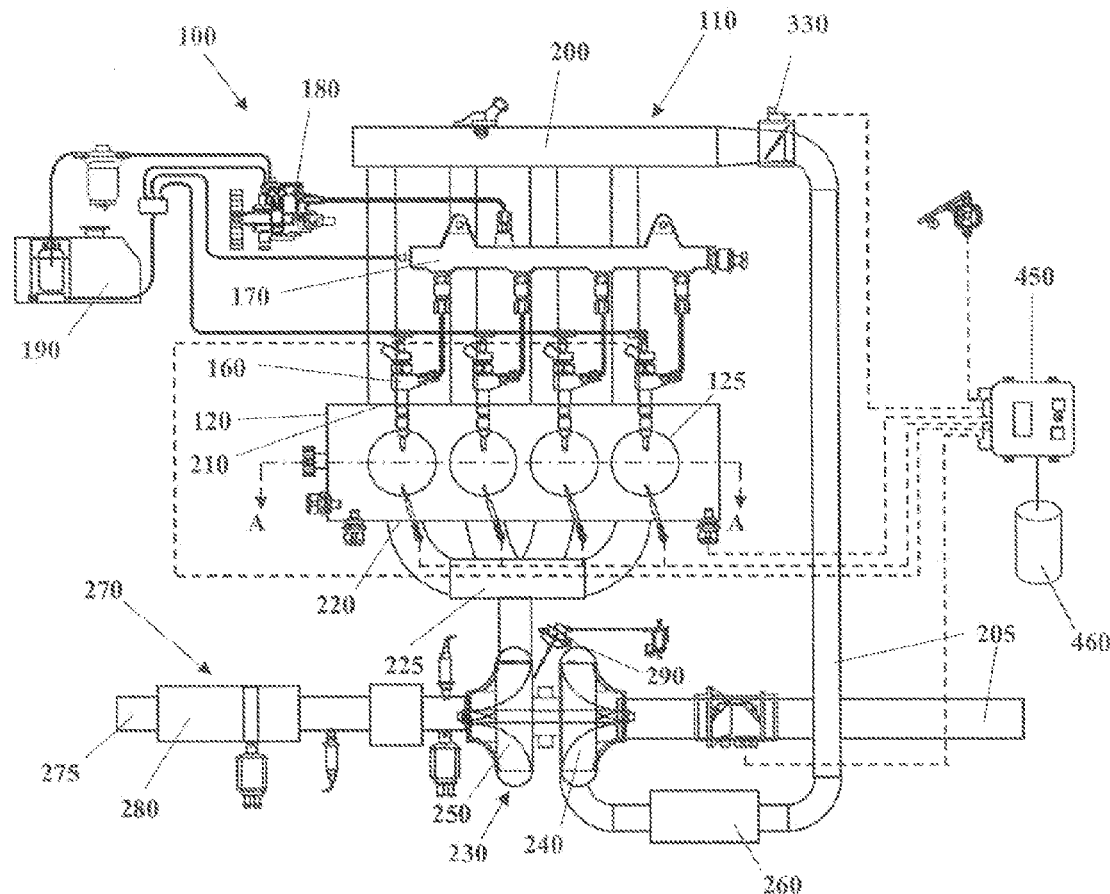
FIG. 1 shows an internal combustion engine system in accordance with an exemplary embodiment.
Figure 2:
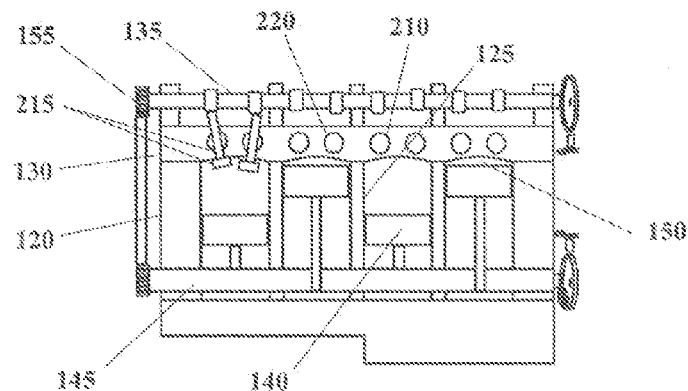
FIG. 2 is a section of an internal combustion engine belonging to the system of FIG. 1.

Some embodiments may include an internal combustion engine system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by a fuel injector 160 and the air through an intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through at least one exhaust port 220. In some examples, a cam phaser 155 may selectively vary the timing between the camshaft 135 and the crankshaft 145.

The air may be distributed to the air intake port(s) 210 through an intake manifold 200. An air intake pipe 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the intake pipe 205 and manifold 200. An intercooler 260 disposed in the intake pipe 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust gases exit the turbine 250 and are directed into an exhaust system 270. The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters.

The internal combustion engine system 100 may further include an electronic control unit (ECU) 450 in communication with a memory system 460 and with one or more sensors and/or devices associated with the ICE 110. The ECU 450 may receive input signals from various sensors configured to generate the signals in proportion to various physical parameters associated with the ICE 110.

Figure 3:
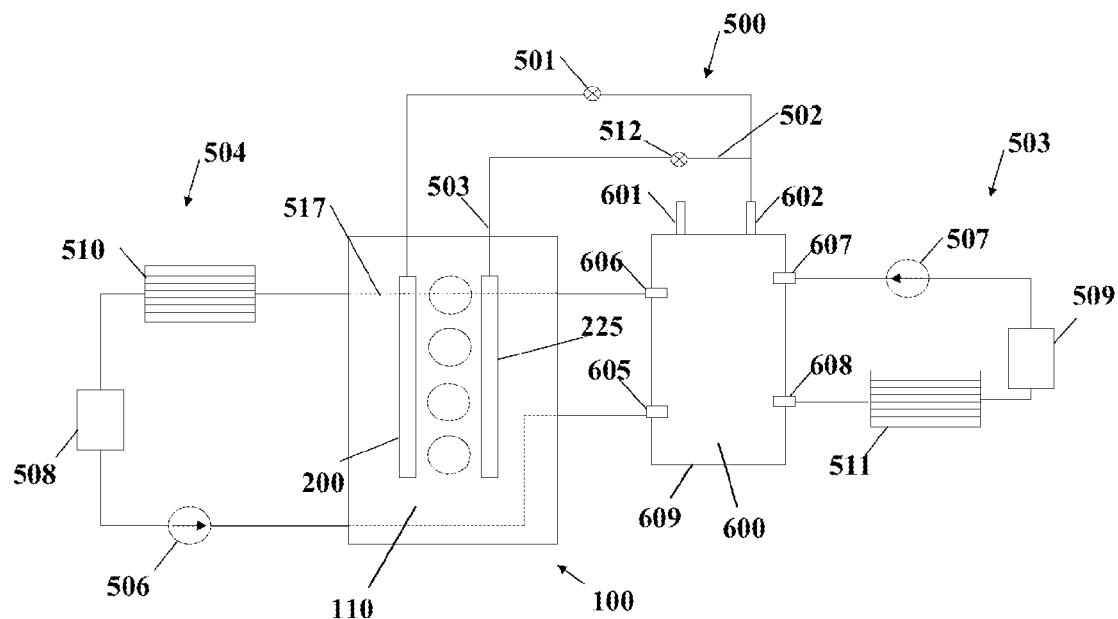
FIG. 3 schematically shows an exhaust gas recirculation (EGR) circuit belonging to the system of FIG. 1.

As schematically shown in FIG. 3, the internal combustion engine system 100 may further comprise an exhaust gas recirculation (EGR) circuit 500 coupled between the exhaust manifold 225 and the intake manifold 200. The EGR circuit 500 is provided for routing back and feeding exhaust gas into the internal combustion engine 110, principally in order to reduce the emission of nitrogen oxides (NOx).

According to an embodiment, the EGR circuit 500 comprises an EGR conduit 503 fluidly connecting the exhaust manifold 225 to the intake manifold 200, and a dual-temperature EGR cooler 600 located in the EGR conduit 503 to reduce the temperature value of the exhaust gases in the EGR circuit 500. An EGR valve 501 downstream of the dual-temperature EGR cooler 600 regulates a flow of exhaust gases in the dual-temperature EGR cooler 600. The EGR valve 501 is connected to the ECU 450 from which it can receive control signals.

An EGR bypass conduit 502 is connected in parallel to the dual-temperature EGR cooler 600 for bypassing the dual-temperature EGR cooler 600. A bypass valve 512 can selectively allow or prevent the flow of the exhaust gas through the EGR bypass conduit 502. The bypass valve 512 is connected to the ECU 450 and may be controlled by the ECU 450, which may determine the path of the exhaust gas, for example on the basis of its temperature value and/or on the basis of the engine operating conditions. This is particular useful when the temperature value of the exhaust gas is already low, for example at the engine start-up when, in order to accelerate the warm-up of the ICE 110, the ECU 450 may be configured to open the bypass conduit 502, preventing the recirculated exhaust gas to be cooled inside the dual-temperature EGR cooler 600.

Figure 4:
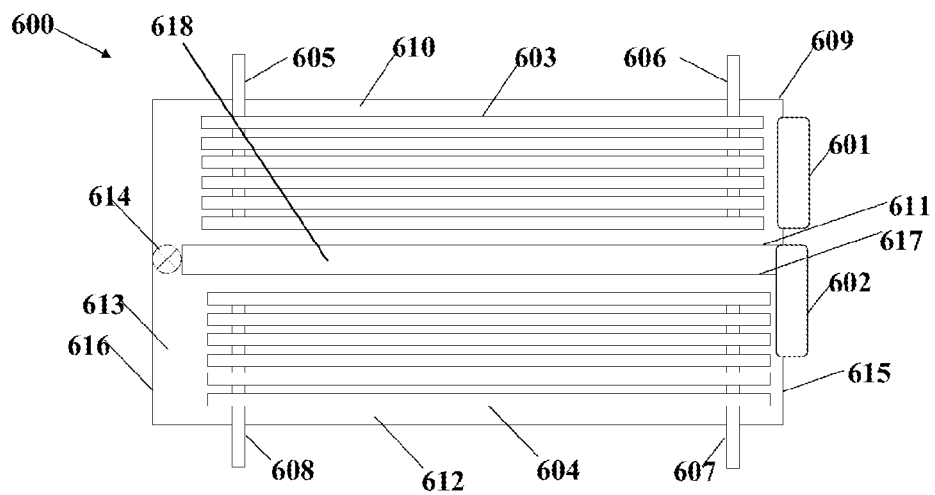
FIG. 4 shows in greater details an exhaust gas recirculation (EGR) cooler belonging to the EGR circuit of FIG. 4.

With reference to FIG. 4, the dual-temperature EGR cooler 600 comprises an external casing 609 provided with an inlet 601 and with an outlet 602 for the exhaust gas flow. The exhaust gas inlet 601 is fluidly connected to the exhaust manifold 225 and the exhaust gas outlet 602 is fluidly connected to the intake manifold 200. In this example, the exhaust gas inlet 601 and exhaust gas outlet 602 are located on a same lateral wall 615 of the external casing 609.

The external casing 609 internally accommodates two tube bundles 603 and 604, which are individually provided for circulating a coolant suitable to cool down the exhaust gas. Each of the two tube bundles, 603 and 604, comprises a coolant inlet, respectively indicated as 605 and 607, and a coolant outlet, respectively indicated as 606 and 608. Each of the two tube bundles, 603 and 604, further comprises a plurality of tubes having open ends fluidly connected to the respective coolant inlet, 605 and 607, and to the respective coolant outlet, 606 and 608, allowing the flowing of the coolant through the tubes. All the coolant inlets and outlets jut out from the external casing 609.

The internal volume of the external casing 609 is arranged so that the exhaust gas flow, which flows from the exhaust gas inlet 601 to the exhaust gas outlet 602, is normally forced to sweep through the two tube bundles 603 and 604 in series, i.e. firstly through the tube bundle 603 and then through the tube bundles 604.

In greater details, the dual-temperature EGR cooler 600 comprises an internal separating wall 611, which extends within the external casing 609 from the lateral wall 615, between the exhaust gas inlet 601 and exhaust gas outlet 602, until a proximity of an opposite lateral wall 616 of the external casing 609. This separating wall 611 ideally divides the internal volume of the external casing 609 in two chambers: a first chamber 610 in direct communication with the exhaust gas inlet 601 and being delimited above by an upper casing wall and below by the separating wall 611; and a second chamber 612 in direct communication with the exhaust gas outlet 602 and being delimited above by the separating wall 611 and below by a lower casing wall. The chambers 610 and 612 are in fluid communication with each other through a connecting passage 613, which is defined within the external casing 609 between the free end of the separating wall 611 and the lateral wall 616. In this way, the exhaust gas flow, which flows from the from the exhaust gas inlet 601 to the exhaust gas outlet 602, is forced by the separating wall 611 in a U-shaped path, passing through the first chamber 610, the connecting passage 613 and the second chamber 612. The tube bundle 603 is accommodated inside the first chamber 610 and the tube bundle 604 is accommodated inside the second chamber 612, so that they are located in series along the above mentioned U-shaped path.

As a consequence, in normal operation, the exhaust gas enters into the external casing 609 via the exhaust gas inlet 601, flows around the tubes of the first tube bundle 603, passes through the connecting passage 613, flows around the tubes of the second tube bundle 604, and then exits from the external casing 609 via the exhaust gas outlet 602.

When the exhaust gas enters into the external casing 609, it normally has a very high temperature value, for example up to 700°. The temperature value of the exhaust gas is then at least partially decreased when it sweeps through the tube bundle 603 by exchange of heat with the coolant in the latter. When the exhaust gas sweeps through the tube bundle 604, its temperature value is further decreased, for example down to 40° by heat exchange with the coolant in the second tube bundle 604. First 603 and second 604 tube bundles are therefore designed to perform at different temperature values, so that normally one refers to the first one as performing a High Temperature Cooling stage and to the second one as performing a Low Temperature Cooling stage.

For such a purpose, the tube bundle 603 is fluidly connected with an engine coolant circuit 504, which is mainly provided for cooling the components of the ICE 110. The engine coolant circuit 504 schematically comprises a coolant pump 506 that delivers an engine coolant, typically a mixture of water and antifreeze, from a coolant tank 508 to a system 517 of cooling channels internally defined by the engine block 120 and by the cylinder head 130, and a radiator 510 for cooling down the coolant, once it has passed through the system 517 of cooling channels and before it returns to the coolant tank 508. The system 517 of cooling channel is fluidly connected with the coolant inlet 605 and coolant outlet 606 of the tube bundle 603, allowing the engine coolant to flow therein. Preferably, the engine coolant circulates through the tube bundle 603 in countercurrent with respect to the exhaust gas flow.

The tube bundle 604 is fluidly connected to a dedicated and independent coolant circuit 505. The coolant circuit 505 comprises a coolant pump 507 that delivers a respective coolant, typically a mixture of water and antifreeze, from a coolant tank 509 to the coolant inlet 607 of the tube bundle 604, allowing the coolant to flow therein. Preferably, the coolant circulates through the tube bundle 604 in countercurrent with respect to the exhaust gas flow. The coolant circuit 505 comprises also a radiator 511 for cooling down the coolant exiting the coolant outlet 608, before it returns to the coolant tank 509. In an alternative layout, not shown in figures, the radiator 511 can be defined as a portion of the radiator 510 of the engine coolant circuit 504.

The use of two independent coolant circuits 504 and 505 has the advantage that two independent coolants, kept at different temperature values, can be used, one for each of the tube bundles, 603 and 604, therefore improving the control on the exhaust gas temperature value.

To guarantee the best efficiency of the cooling process it is important to reduce as much as possible any unwanted heat exchange between first 603 and second 604 tube bundles.

Furthermore it is also important to safeguard the state of the tube bundles 603, 604 and in particular to reduce the risk of clogging or fouling due to accumulation inside the tube bundles 603, 604 of high amount of Hydrocarbons (HC) and soot.

For these purposes, according to an embodiment, the dual-temperature EGR cooler 600 comprises an additional separating wall 617, which extends within the external casing 609 from the lateral wall 615 until a proximity of an opposite lateral wall 616 of the external casing 609. The additional separating wall 617 is parallel and spaced apart from the separating wall 611, thereby defining with the latter a hollow passage 618, which separates the tube bundle 603 from the tube bundle 604 and which fluidly connects the exhaust gas outlet 602 directly to the connecting passage 613.

This hollow passage 618 advantageously attains the double function of improving the thermal insulation between the tube bundle 603 and the tube bundle 604, and defining a bypass passage for conveying the exhaust gas flow from downstream the tube bundle 603 to the exhaust gas outlet 602 of the external casing 609, bypassing the tube bundle 604.

Alternatively the hollow passage 618 may be defined by one or more conduits located between the first 603 and the second tube bundle 604, and having opposite open ends fluidly connected to the connecting passage 613 and to the exhaust gas outlet 602.

The dual-temperature EGR cooler 600 is further provided with a valve 614 for selectively allowing the exhaust gas to flow into the hollow passage 618 and bypass the tube bundle 604, reducing the amount of the exhaust gas through the second tube bundle 604 and therefore the amount of soot which is responsible for fouling and clogging.

The valve 614 is located in the connecting passage 613 in correspondence of the inlet of the hollow passage 618 and is connected to the ECU 450. The ECU 450 is configured to send control signals to vale 614. The valve 614 can be realized using a flap suitable to move between a first position in which the flap blocks the hollow passage 618 and allows the exhaust gas to flow through the second tube bundle 604, and a second position in which the flap allows the exhaust gas to flow into the hollow passage 618 towards the exhaust gas outlet 602, effectively causing the exhaust gas to bypass the second tube bundle 604.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. An exhaust gas recirculation cooler for an internal combustion engine, the exhaust gas recirculation cooler comprising:
    an external casing with an inlet and an outlet for an exhaust gas flow;
    a first tube bundle and a second tube bundle, each with an inlet and an outlet for a coolant, wherein the first tube bundle and the second tube bundle are located inside the external casing so that the exhaust gas flow flows through the first tube bundle and the second tube bundle in series; and
    a bypass passage for conveying the exhaust gas flow from downstream the first tube bundle to the outlet of the external casing bypassing the second tube bundle, wherein the bypass passage is located inside the external casing between the first tube bundle and the second tube bundle.

2. The exhaust gas recirculation cooler according to claim 1, further comprising a valve for selectively allowing the exhaust gas flow to flow into the bypass passage.

3. An internal combustion engine system comprising an internal combustion engine, an intake manifold, an exhaust manifold, and an exhaust gas recirculation cooler comprising:
    an external casing with an inlet and an outlet for an exhaust gas flow;
    a first tube bundle and a second tube bundle, each with an inlet and an outlet for a coolant, wherein the first tube bundle and the second tube bundle are located inside the external casing so that the exhaust gas flow flows through the first tube bundle and the second tube bundle in series; and
    a bypass passage for conveying the exhaust gas flow from downstream the first tube bundle to the outlet of the external casing bypassing the second tube bundle, and the bypass passage is a hollow passage defined by a first separating wall adjacent to the first tube bundle and a second separating wall spaced apart from the first separating wall and adjacent to the second tube bundle, wherein the bypass passage is located inside the external casing between the first tube bundle and the second tube bundle,
    wherein the inlet of the external casing for the exhaust gas flow is fluidly connected to the exhaust manifold and the outlet of the external casing for the exhaust gas flow is fluidly connected to the intake manifold.

4. The internal combustion engine system according to claim 3, further comprising an exhaust gas recirculation cooler bypass conduit for bypassing the exhaust gas recirculation cooler and an exhaust gas recirculation valve for selectively allowing the exhaust gas flow to flow into the exhaust gas recirculation cooler bypass conduit.

5. The internal combustion engine system according to claim 3, wherein the first tube bundle is fluidly connected to a first coolant circuit and the second tube bundle is fluidly connected to a second independent coolant circuit.

6. The internal combustion engine system according to claim 5, wherein the first coolant circuit comprises an engine coolant circuit.

* * * * *